(12) United States Patent
Black et al.

(10) Patent No.: US 8,245,959 B1
(45) Date of Patent: Aug. 21, 2012

(54) POWERED CARD AND METHOD OF DISPOSING OF THE SAME

(75) Inventors: Robert Black, Brookline, MA (US); Yong Qiao, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 394 days.

(21) Appl. No.: 12/494,442

(22) Filed: Jun. 30, 2009

(51) Int. Cl.
*B02C 19/00* (2006.01)
(52) U.S. Cl. .......................................... 241/30
(58) Field of Classification Search ............... 241/30, 241/101.2, 25
See application file for complete search history.

(56) References Cited

U.S. PATENT DOCUMENTS

| | | | |
|---|---|---|---|
| 6,390,375 B2 | 5/2002 | Kayanakis | |
| 6,484,945 B1 | 11/2002 | John et al. | |
| 6,594,361 B1 | 7/2003 | Chaney et al. | |
| 6,851,618 B2 | 2/2005 | Halope | |
| 7,506,165 B2 | 3/2009 | Kocher et al. | |
| 7,665,668 B2 | 2/2010 | Phillips | |
| 7,967,214 B2 * | 6/2011 | Landau et al. | 235/492 |
| 2004/0102533 A1 * | 5/2004 | Durand et al. | 521/40 |

* cited by examiner

*Primary Examiner* — Mark Rosenbaum
(74) *Attorney, Agent, or Firm* — BainwoodHuang (57) ABSTRACT

A method for disposing of self-powered cards includes eradicating any identifying information from the card without damaging the power source in a manner that would allow unwanted materials to become exposed, and disposing of the power source. In one embodiment, the method includes first identifying the location of the power source. Eradication can take many forms, for example, damaging the magnetic strip (demagnetizing or cutting); obscuring information on the body of the card; and/or disabling the smart chip. Once all identifying information is eradicated without damaging the power source, the power source can be properly disposed of at a waste disposal site. The information can be removed by the owner of the information or by a facility that has security safeguards to protect the information. Because the identifying information is eradicated, any waste disposal site that disposes of power sources can be used, regardless of the sensitivity of the information.

33 Claims, 6 Drawing Sheets

POWERED CARD AND METHOD OF DISPOSING OF THE SAME

BACKGROUND

The term "data card" conventionally refers to cards that have a magnetic strip containing a limited amount of read-only data. These cards also include other identifiers such as imprinted names, card expiration dates, and account numbers, to name just a few. Examples of data cards include financial cards such as credit cards, debit cards, ATM cards, as well as non-financial data cards for example department store cards, car rental cards, hotel cards, airline cards, etc. Data cards can also include driver's licenses, transit cards, building security cards, and personal identification cards, and the like. Data cards are very common and most people carry one or more of the various types of data cards.

Data card security relies on the physical security of the card, as well as the privacy of the credit card number and other identifying information, such as the user name. Therefore, whenever a person other than the card owner has access to the card or its number, security is potentially compromised. Data on the magnetic stripe can also easily be read, written, deleted or changed with off-the-shelf equipment. Therefore, the magnetic stripe is not the ideal place to store sensitive information. The low security of the data cards presents countless opportunities for fraud. This opportunity has created a huge black market in stolen card numbers.

A smart card, chip card, or integrated circuit(s) card (ICC), is a device that includes an embedded integrated circuit that can be either a secure microcontroller or other intelligence with internal memory, or a memory chip alone. With an embedded microcontroller, smart cards have the unique ability to store large amounts of data, carry out their own on-card functions (e.g., encryption and mutual authentication) and interact intelligently with a smart card reader. Smart card technology has international standards (ISO/IEC 7816 and ISO/IEC 14443) for conformance, and is available in a variety of form factors, including plastic cards, fobs, subscriber identification modules (SIMs) used in GSM mobile phones, and USB-based tokens to name a few. Smart cards are engineered to be tamper-resistant, for example many include the ability to implements a cryptographic algorithm. For banks interested in reducing fraud, in particular resulting from counterfeit, lost and stolen data cards, utilizing smart cards can result in a quantifiable benefit.

As will be appreciated, conventional data cards have limited capabilities while smart cards can hold much more information along with providing enhanced security features. The applications for smart cards is widespread, including but not limited to their use as credit or ATM cards, SIMs for mobile phones, authorization cards for pay television, high-security identification and access-control cards, and public transport payment cards. Smart cards may also be used as electronic wallets. The smart card chip can be loaded with funds that can be spent in parking meters and vending machines or at various merchants. Smart cards also allow multiple card issuers to be represented with a single card, thereby allowing consumers to carry just one card for several types of transactions, including those identified above.

Smart cards are gaining popularity in the United States and have already found wide acceptance across Europe. The Frost & Sullivan *Americas Smart Card Market Analysis* report published in collaboration with the Smart Card Alliance in September 2005 predicts that the smart card industry will grow rapidly in North America, at a 27.7 percent compound annual rate over the next five years, from the 132.2 million cards shipped in 2004. The same report predicts even greater growth in Latin America, namely a 59 percent compound annual growth rate over the next five years, from 136.4 million cards shipped in 2004.

SUMMARY

As the use of smart cards increases, needs will have to be addressed that are particular to this form of technology. One need that will have to be addressed is the destruction and the proper disposal of the device itself. An internal power source, for example a battery that is connected to the microprocessor has recently begun to be used to power smart cards. Battery-powered cards are also known in other applications, for example in novelty cards that create a noise or light up during use. The provision of a battery or other power source within a smart card allows it to power itself, i.e. it does not rely on an external source, such as an RF field to induce an electrical current within the card. Although relatively new, cards with internal power source are gaining market interest in a variety of applications, such as One Time Password strong authentication, electronic wallets, novelty cards, etc.

Unlike conventional data cards, the disposal of a power source within the card provides a unique challenge because it can contain hazardous materials that require special disposal. In addition, the identifying information provided in smart cards is even greater than on traditional data cards and the information must also be destroyed without damaging the power source. Because the card contains a power source, such as a battery, the housing of the power source should not be shred, cut or otherwise punctured or damaged in a manner that could release hazardous material.

The present invention provides a method for eliminating identifying information from the card without damaging the power source in a manner that would allow hazardous material to become exposed, and disposing of the power source in a safe manner. A card is also provided where the power source is provided in an area not including identifying information in order to allow the identifying information to be more readily eradicated without damaging the power source in a manner that would allow hazardous material to become exposed. According to one embodiment of the method, the user first identifies the location of the power source, and thereafter the identifying information is eradicated without causing damage to the power source that could release the hazardous material. Eradication can take many forms, for example, damaging the magnetic strip; obscuring information on the body of the card; and/or disabling the smart chip. Once the information is eradicated, the user may transfer the card to a third party for proper disposal of the remainder of the card, including the power source. In one embodiment, the power source is a conventional battery and the user is the consumer. In another embodiment, the user may be the card issuing company, or other authorized entity.

BRIEF DESCRIPTION OF THE DRAWINGS

The foregoing and other features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

A method for disposing a card having a power source includes eradicating any identifying information from the card without damaging the power source in a manner that would allow unwanted materials to become exposed, and disposing of the power source in a safe manner. It should be understood that card described herein is an example card and although the description that follows is with respect to a generally rectangular, credit card shaped and sized smart card, the dimensions, number and location of components on and within the card, as well as the shape and size of the card, may be readily varied, as would be known to those of skill in the art. Likewise, although smart cards are described herein, the method may also be used with other devices including other types of cards, tokens, or similar items that include a power source and identifying information.

Currently, smart cards come in two general varieties; contact cards and contactless cards. A contact smart card is one that includes contacts that enable access to the data and functional capabilities of the card, typically via some form of terminal or card reader that engages the contacts on the card. Transmission of commands, data, and card status takes place over these physical contact points. A contactless smart card is a smart card that incorporates a manner of communicating with the card reader or terminal without the need for direct contact. Thus, such cards may effectively be "swiped" by passing the card close to the card reader or terminal. Contactless cards typically communicate with the card reader or terminal using RF (radio-frequency) technology, where proximity to an antenna causes data transfer between the card and the reader or terminal. A smart card may also be both a contact card and a contactless card. For example, a hybrid card has two chips, one with a contact interface and one with a contactless interface. The two chips are not interconnected. A dual-interface or combo-card has a single chip with both contact and contactless interfaces. With dual-interface cards, it is possible to access the same chip using either a contact or contactless interface, depending on the technology of the reader. Although a single, prior art smart card is illustrated and described below, including a contact interface, the invention is intended for use with all types of contact and contactless cards, including but not limited to hybrid and dual-interface cards.

Figure 1A:
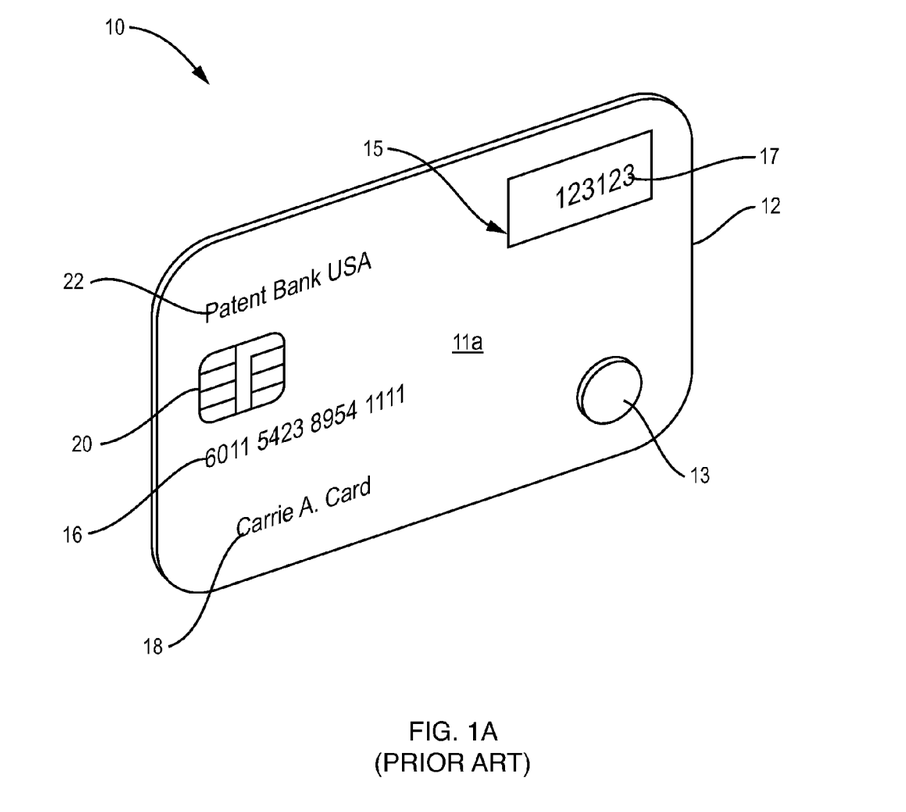
FIG. 1A is a perspective front view of an example prior art, internally-powered smart card.
Figure 1B:
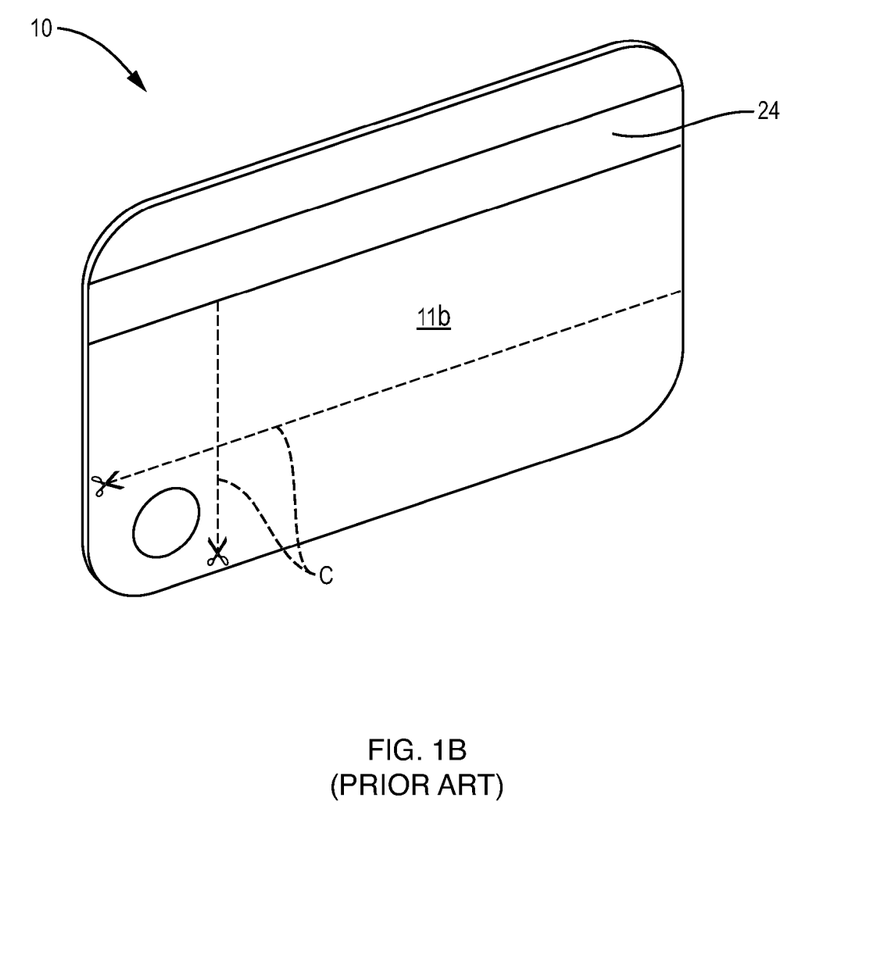
FIG. 1B is a perspective rear view of the prior art card of FIG. 1A.

An example prior art smart card 10 is illustrated in FIGS. 1A-1B, which includes a card body 12 having a front surface 11a and a rear surface 11b that is typically made of plastic, for example PVC or ABS, although other materials may be utilized. The front surface 11a may include identifying information such as a card number 16 embossed into the card, and user name 18 imprinted thereon. External contacts 20 may also be included on one surface of the card if the card is a contact card, or if the card is a dual-interface or hybrid card, as described above. Contacts 20 are designed to make a physical connection with the contact wiper pads of a reader device (not shown), as is known in the art. The front and/or rear surface may also include other information such as the issuing entity 22, and magnetic strip 24 which includes other identifying information, as is also known in the art. The magnetic strip provides redundant information and allows conventional data card readers to accept the card.

In the card of FIGS. 1A-1B, front surface 11a also includes an activation member, for example button 13, and window 15 disposed therein. Button 13 is depressed in order to receive a one-time passcode (OTP) 17 which is displayed in window 15 in a prescribed order for security purposes, as is known in the art. Although card 10 includes a button 13 that is activated by a user to produce an OTP that is visible in display window 15, other elements may be utilized to display the OTP other than a button. In addition, the window may be utilized to display information other than an OTP, for example a cash balance, and multiple windows and/or buttons are also possible. The card could also contain a button that is not used in conjunction with a window, for example to produce a sound or light effect such as with novelty cards. The button and window may also be entirely absent from the card, as may the magnetic strip, as would also be known in the art.

Figure 2:
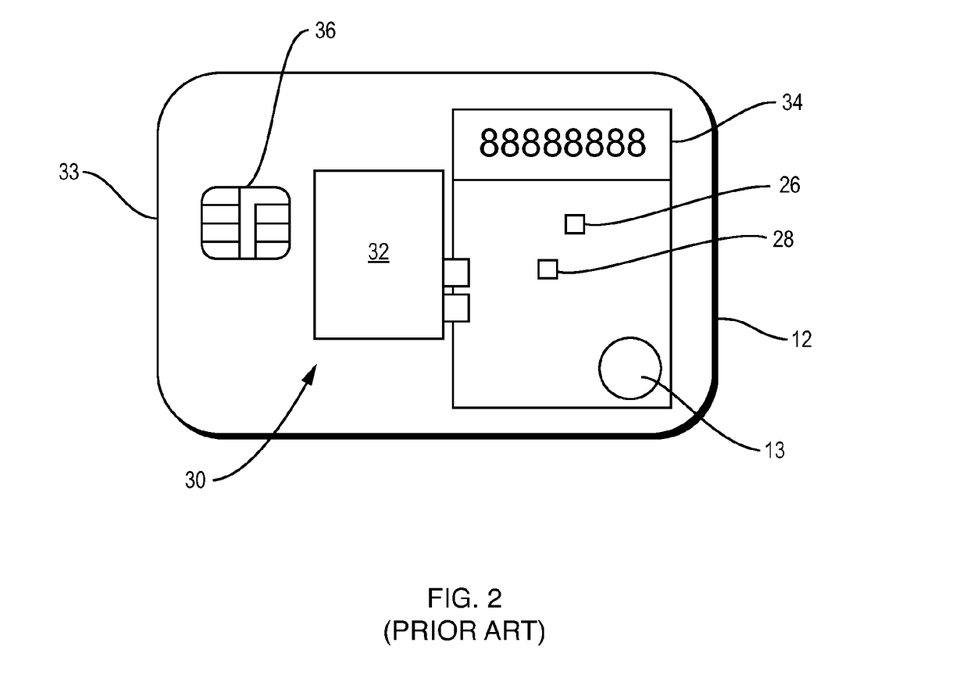
FIG. 2 is a schematic of the interior of the prior art card of FIG. 1A.

Referring now to FIG. 2, the internal components of the prior art card of FIGS. 1A-1B are illustrated schematically. The internal components are embedded within the body 12 of the card and are fixed therein. Thus, the components are not generally visible to a user. The body 12 of the smart card may house a microprocessor 26 along with other electronic components 28 that are electrically connected to a power source 30. As used herein, the term "power source" is used to mean any source of power that is supported within the card and which uses a material that requires special handling and/or disposal, such as a hazardous material. In FIG. 2, the power source is illustrated as a battery 32, for example a lithium battery, but alternate power sources may be utilized as defined above.

Battery 32 is generally thin and flexible because the card 10 may flex during use, and it is desirable that the battery not break if the card flexes. For example, if the card is placed in a wallet and sat upon, among other things, the card will flex. The battery 32 is embedded within the body 12 of the card such that it is generally not visible in the card when the front surface and back surface are opaque, as is traditional. The battery 32 may also be positioned a distance from external edge 33 of the card in order to better protect the battery from damage. The card 10 may also include a display 34 housed within the body that is thin and flexible, and which outputs the OTP or other information viewed through the window 15. The card as illustrated is a contact card and, as such, includes chip 36 disposed therein connected to contacts 20. In another embodiment, the microprocessor 26 and chip 36 are on a single chip. If the card were a contactless card, or if the card were a dual-interface or hybrid card, the body of the card would also include an antenna embedded therein (not shown).

When card 10 expires, it is necessary to destroy the identifying information on the card as the card may be replaced with a new card having the same or similar identifying information, such as account number and name, with a different expiration date. Thus, care must be taken to destroy the identifying information on the expired card, including the magnetic strip and the body of the card where information is printed, engraved, or embossed. Some consumers do not destroy their cards in a suitable manner to prevent retrieving the information from the card. By not properly destroying a card, the information on the card may be later retrieved from the trash, and used for fraudulent activity. With prior art data cards, many consumers physically destroy expired data cards by placing them in a shredder, manually cutting through the card with a pair of scissors, or by otherwise destroying the card. With a card having a battery, such as card 10 and battery 32 a shredder should not be utilized because it would damage the battery, allowing hazardous materials to become exposed, potentially causing damage to equipment and/or unwanted exposure to individuals. Care should also be taken, if manually cutting through the card or otherwise destroying the card because the housing of the battery could become damaged, also allowing hazardous materials to become exposed.

Figure 4:
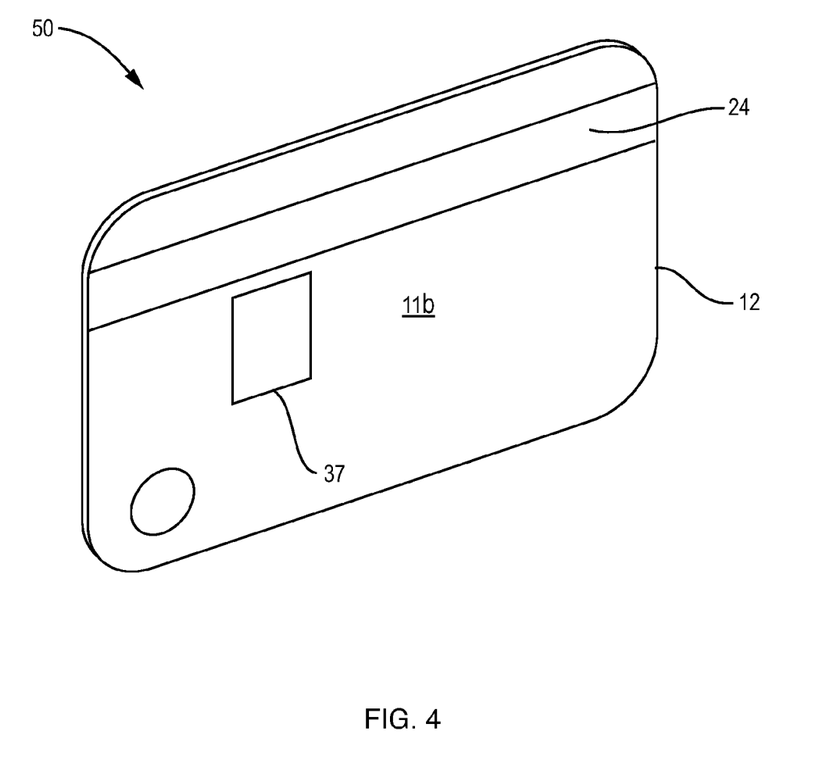
FIG. 4 is a schematic view of a card including a power source identifier on the card body.

In order to avoid the dangers associated with damaging the power source, a card 50 may be provided by the card manufacturer as illustrated in the embodiment FIG. 4, where the power source is positioned so that the identifying information can be eradicated without damaging the power source in a manner that would release hazardous materials from the power source. In FIG. 4, the position of the power source is indicated by dotted lines 37, although dotted lines or other indicators are not required provided that the power source is positioned in an appropriate location. With the power source in this position, the information on the card can be removed while avoiding contact with the power source because the power source is not positioned in an area including identifying information. Generally, the power source should not be positioned directly behind the external contacts, or beneath embossed numbers or other embossing on the card of FIG. 4.

Figure 3A:
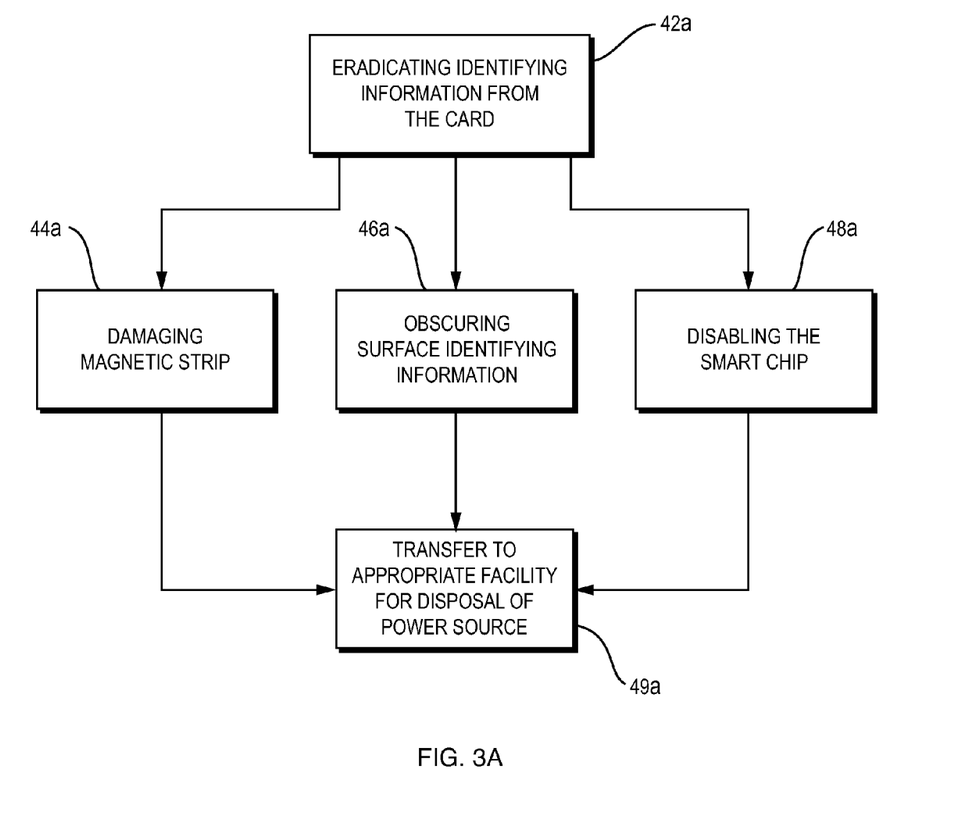
FIG. 3A is block diagram illustrating a first method of disposing of a powered card.

A method of disposing of card 10 will now be described with reference to FIG. 3A. This method is suitable for prior art cards having a power source, as well as the card 50 where the power source is specifically positioned. A user first removes the identifying information from the card 42a without causing damage to the power source. For example, if the card contains a magnetic strip, the user can eradicate the identifying information by damaging the magnetic strip 44a, for example be demagnetizing the strip, cutting or otherwise destroying the strip (while avoiding contact with the power source). If the card contains identifying information printed, etched or embossed on the front and/or rear surfaces of the card, such as the cardholder name 18, account number 16 or issuing entity 22, the user can eradicate the identifying information by obscuring the identifying information on the body of the card 46a, for example by laser engraving over the identifying information, thermal printing over the identifying information, or otherwise writing or printing over the identifying information. Alternately, the user can eradicate the identifying information on the surface of the card by cutting through the identifying information while avoiding contact with the power source. Cutting through the identifying information can be accomplished with activities such as cutting or pulling off the top and bottom lamination layers of the card, or scoring through a portion of the card for example. The user also can eradicate the identifying information by disabling, removing, or destroying the smart chip 48a, which can include physically removing the smart chip from the body of the card, or destroying the smart chip, or permanently disabling the chip via programming or electrically disabling the card without physically removing or destroying the chip.

The user that removes the identifying information can either be the owner of the personal information, or a secure facility, for example a Bank Card Association Approved Facility that has the necessary security safeguards to have the action performed, i.e., to remove the identifying information without compromising the identifying information. If the owner of the personal information eradicates the information, instructions can be provided by the issuer of the card on proper techniques for removal of the information, for example by magnetic field, scoring over information on the face of the card, etc., as described herein above. The instructions may also include directions on where the power source is located within the card to aid the user in avoiding the power source during eradication of the identifying information. Specialized tools, such as a tool that scores through only a top layer of the card, a specialized magnet having sufficient power to demagnetize the strip, etc. may also be provided along with the instructions to the owner. Alternatively, instructions may be provided to the owner of the personal information on returning the card to the secure, authorized facility, along with an appropriate secure mailer, as desired. In this arrangement, the authorized facility (central processing entity or the like) performs the eradication of the identifying information. For example, upon the expiration of the user's card or upon receipt of replacement cards, the user is prompted to mail the cards to be terminated to the authorized facility in a security envelope, for example to a Bank Card Association Approved Facility (BCAAF) that has the necessary security safeguards to have the action performed, i.e., to remove the identifying information without compromising the identifying information. Upon receipt of the cards by secure facility (BCAAF or the like), the facility carries out the eradication of the identifying information, as described herein above (ex., destruction of the magnetic strips, obstruction or destruction of visual data, and/or deactivation or destruction the smart chip). Thereafter, the authorized facility provides the cards to a suitable disposal or recycling facility which safely disposes and/or recycles portions of the cards, as described below.

Once all identifying information has been eradicated, either by the owner of the information or by an authorized facility, the power source can be properly disposed of at an appropriate waste disposal site. Moreover, the owner or authorized facility does not need to implement a processing solution for disposal, but is able to simply outsource such handling to a third party capable of disposing of such waste. Because the identifying information has been eradicated, the waste disposal site can be any site that disposes of power sources, without regard to the sensitivity of the identifying information.

Figure 3B:
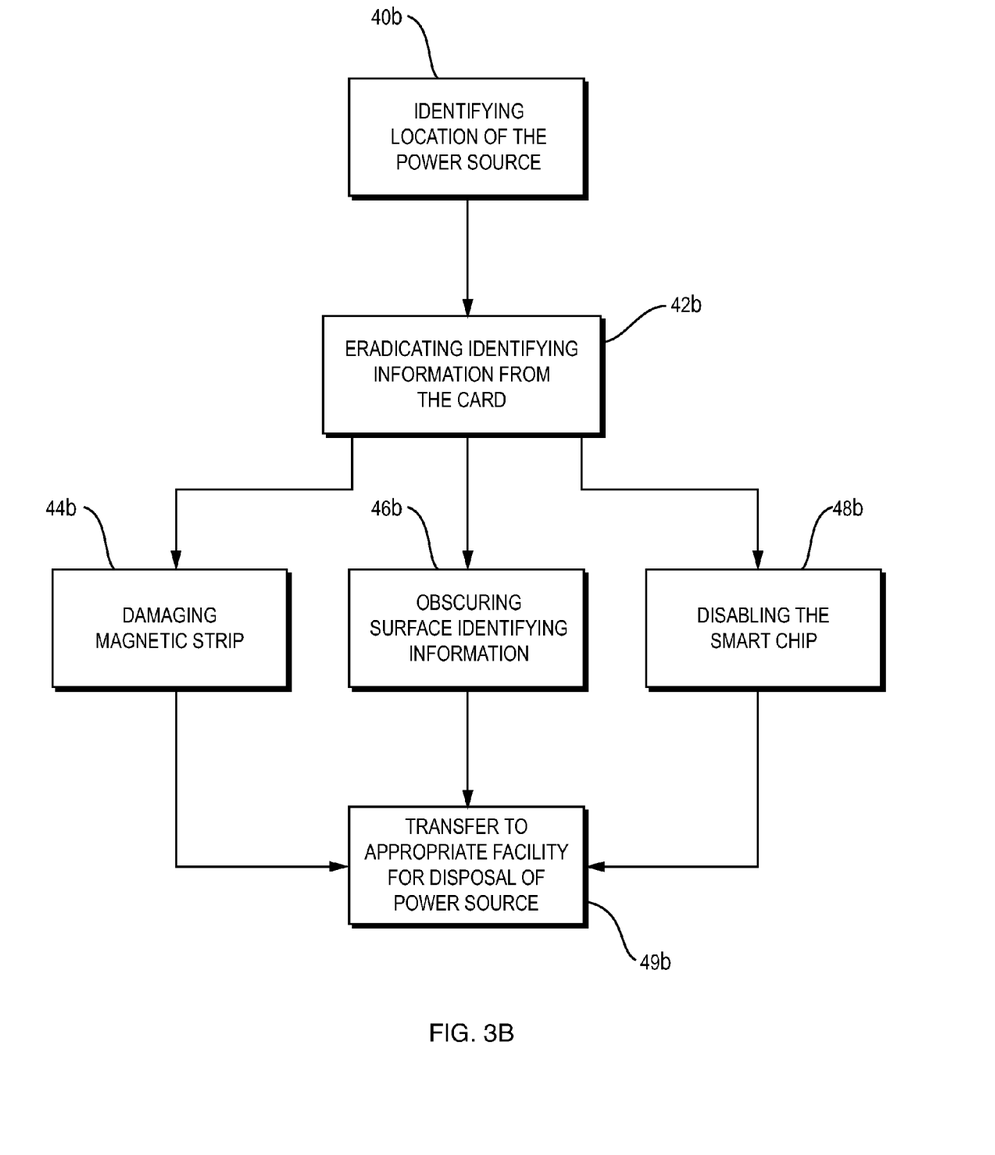
FIG. 3B is block diagram illustrating a second method of disposing of a powered card.

An alternate method of disposing of card 10 will now be described with reference to FIG. 3B. In this method, to dispose of the card without damaging the power source 32, the location of the power source is first identified 40b. Manufacturers can place the power source in a variety of locations within the card. One manner of identifying the location of the power source can be provided by the manufacturer indicating the location of the power source, for example by a window or outlining 37 the position of the power source as shown in FIG. 4. Generally, the power source will not be positioned directly behind the external contacts, or beneath embossed characters on the card. However, this still leaves other space within the card that may or may not house the power source. The card issuer may provide separate instructions to the consumer on the location of the power source within the card if the consumer is the user eradicating the identifying information from the card. Once the power source is located, the user can then eradicate the identifying information from the card 42b without causing damage to the power source, as described herein above. For example, if the card contains a magnetic strip, the user can eradicate the identifying information by damaging the magnetic strip 44b, for example be demagnetizing the strip, cutting or otherwise destroying the strip (while avoiding contact with the power source). If the card contains identifying information printed, etched or embossed on the front and/or rear surfaces of the card, the user can eradicate the identifying information by obscuring the identifying information on the body of the card 46b, for example by laser engraving over the identifying information, thermal printing over the identifying information, or otherwise writing over the identifying information or by cutting through the identifying information while avoiding contact with the power source, as described above. The user also can eradicate the identifying information by disabling, removing, or destroying the smart chip 48b, which can include physically removing the smart chip from the body of the card, or destroying the smart chip, or permanently disabling the chip via programmatic or electrical means without physically removing or destroying the chip.

Again, the identifying information can be removed either in the control of the owner of the personal information, or at a secure facility, for example a Bank Card Association Approved Facility that has the necessary security safeguards to have the action performed, i.e., to remove the identifying information without compromising the identifying information, as described in greater detail herein above. If the owner of the personal information eradicates the information, instructions can be provided for eradicating the information, returning the card, and specialized tools can also be provided, as also described above. The power source can then be properly disposed of at an appropriate waste disposal site, without regard to the sensitivity of the identifying information.

While various embodiments of the invention have been particularly shown and described, it will be understood by those skilled in the art that various changes in form and details may be made therein without departing from the spirit and scope of the invention as defined by the appended claims. For example, the type of card may be readily modified and some, but not all of the components disclosed herein may be include in the card to provide identifying information, as would be known to those of skill in the art. Likewise, the drawings provided are not to be construed as limiting, but as example embodiments.

What is claimed is:

1. A method of disposing of a card having identifying information and a power source, comprising:
   eradicating the identifying information from the card at a first location without damaging the power source in a manner that would allow unwanted materials to become exposed; and
   transferring at least the power source to a second location for disposal;
   wherein the card further has a card body which includes (i) a power source containing portion to contain the power source and (ii) a identifying information support portion to support the identifying information; and
   wherein eradicating the identifying information from the card includes eliminating access to the identifying information while the power source remains contained within the power source containing portion of the card body.

2. The method of claim 1, wherein the identifying information is eradicated by the owner of the information so that the owner does not have to disclose the identifying information to a third party, and further comprising the step of providing the user with directions on eradicating the identifying information.

3. The method of claim 1, wherein the identifying information is eradicated by an authorized facility sufficiently secure such that the identifying information can be disposed of properly.

4. The method of claim 1, wherein eradicating the identifying information comprises the step of damaging a magnetic strip supported on a body of the card in order to eradicate the identifying information without damaging the power source in a manner that would allow unwanted materials to become exposed.

5. The method of claim 4, wherein damaging the magnetic strip comprises
   a step selected from the group consisting of demagnetizing the strip and cutting the strip, without damaging the power source in a manner that would allow unwanted materials to become exposed.

6. The method of claim 1, wherein eradicating the identifying information comprises the step of obscuring the identifying information on the body of the card.

7. The method of claim 6, wherein obscuring the identifying information on the body of the card comprises a step selected from the group consisting of laser engraving over the identifying information, printing over the identifying information, writing over the identifying information, cutting through the identifying information, and scoring through the identifying information without damaging the power source in a manner that would allow unwanted materials to become exposed.

8. The method of claim 1, wherein eradicating the identifying information comprises disabling a smart chip.

9. The method of claim 8, wherein disabling the smart chip comprises physically destroying the smart chip.

10. The method of claim 8, wherein disabling the smart chip comprises physically removing the smart chip.

11. The method of claim 8, wherein disabling the smart chip is done electronically and the chip is not physically removed from the card and is not physically destroyed.

12. The method of claim 8, wherein disabling the smart chip is done by programming the chip and the chip is not physically removed and is not physically destroyed.

13. The method of claim 1, wherein eradicating the user identifiable information comprises the step of physically separating the card into pieces without damaging the power source in a manner that would allow unwanted materials to become exposed.

14. The method of claim 13, wherein physically separating the card comprises delaminating the front surface from the rear surface of the card.

15. The method of claim 1, wherein the power source is a battery.

16. A method as in claim 1 wherein eliminating access to the identifying information while the power source remains contained within the power source containing portion of the card body includes:
    cutting through the identifying information support portion to eliminate the identifying information from the card while the power source remains contained within the power source containing portion of the card body.

17. A method as in claim 1 wherein the first location is a secure facility and the second location is a waste disposal facility, the secure facility having a higher level of security than the waste disposal facility;
    wherein eliminating access to the identifying information includes destroying the identifying information to prevent the card from further providing the identifying information while the card resides at the secure facility and while the power source remains contained within the power source containing portion of the card body; and
    wherein transferring at least the power source to the second location for disposal includes, after the identifying information is destroyed, transporting the card to the waste disposal facility while the power source remains contained within the power source containing portion of the card body.

18. A method as in claim 17 wherein the power source includes a battery;
   wherein the power source containing portion holds the battery in a fixed position internally in a tamper resistant manner;
   wherein transporting the card to the waste while the power source remains contained within the power source containing portion of the card body includes moving the card from the secure facility to the waste disposal facility while the battery remains held within the power source containing portion in the fixed position internally in the tamper resistant manner.

19. A method of disposing of a card having identifying information and a power source, comprising:
   identifying the location of the power source within the card;
   eradicating the identifying information from the card without damaging the power source in a manner that would allow unwanted materials to become exposed; and
   transferring at least the power source to a prescribed disposal site;
   wherein the card further has a card body which includes (i) a power source containing portion to contain the power source and (ii) a identifying information support portion to support the identifying information; and
   wherein eradicating the identifying information from the card includes eliminating access to the identifying information while the power source remains contained within the power source containing portion of the card body.

20. The method of claim 19, wherein the identifying information is eradicated by the owner of the information and further comprising the step of providing the user with directions on locating the power source and directions on eradicating the identifying information.

21. The method of claim 19, wherein the identifying information is eradicated by an authorized facility sufficiently secure such that the identifying information can be disposed of properly.

22. The method of claim 19, wherein eradicating the identifying information comprises the step of damaging a magnetic strip supported on the body in order to eradicate the identifying information without damaging the power source in a manner that would allow unwanted materials to become exposed.

23. The method of claim 22, wherein damaging the magnetic strip comprises
   a step selected from the group consisting of demagnetizing the strip, and cutting the strip without damaging the power source in a manner that would allow unwanted materials to become exposed.

24. The method of claim 19, wherein eradicating the identifying information comprises the step of obscuring the identifying information on the body of the card.

25. The method of claim 24, wherein obscuring the identifying information on the body of the card comprises a step selected from the group consisting of laser engraving over the identifying information, printing over the identifying information, writing over the identifying information, cutting through the identifying information, and scoring through the identifying information without damaging the power source in a manner that would allow unwanted materials to become exposed.

26. The method of claim 19, wherein eradicating the identifying information comprises disabling a smart chip.

27. The method of claim 26, wherein disabling the smart chip comprises physically removing the smart chip.

28. The method of claim 26, wherein disabling the smart chip comprises physically destroying the smart chip.

29. The method of claim 26, wherein disabling the smart chip is done electronically and the chip is not physically removed and is not physically destroyed.

30. The method of claim 26, wherein disabling the smart chip is done by programming the chip, and the chip is not physically removed and is not physically destroyed.

31. The method of claim 19, wherein eradicating the user identifiable information comprises the step of physically separating the card into pieces without damaging the power source in a manner that would allow unwanted materials to become exposed.

32. The method of claim 31, wherein physically separating the card comprises delaminating the front surface from the rear surface of the card.

33. The method of claim 19, wherein the power source is a battery.

\* \* \* \* \*